(12) United States Patent
He et al.

(10) Patent No.: US 11,383,782 B2
(45) Date of Patent: Jul. 12, 2022

(54) QUICK DISASSEMBLY STRUCTURE AND BICYCLE LIGHT

(71) Applicant: Shenzhen Olight E-Commerce Technology Co., Ltd., Guangdong (CN)

(72) Inventors: Hangjin He, Guangxi (CN); Manchun Cai, Guangdong (CN); Ziyang Zhou, Hubei (CN)

( * ) Notice: Subject to any disclaimer, the term of this patent is extended or adjusted under 35 U.S.C. 154(b) by 0 days.

(21) Appl. No.: 17/528,160

(22) Filed: Nov. 16, 2021

(65) Prior Publication Data

US 2022/0073162 A1 Mar. 10, 2022

(30) Foreign Application Priority Data

Sep. 26, 2021 (CN) ............................ 202111127947.5

(51) Int. Cl.
  *B62J 6/03* (2020.01)
  *B62J 6/029* (2020.01)
(52) U.S. Cl.
  CPC .................. *B62J 6/03* (2020.02); *B62J 6/029* (2020.02)
(58) Field of Classification Search
  CPC ...................................... B60J 6/029; B60J 6/03
  See application file for complete search history.

(56) References Cited

U.S. PATENT DOCUMENTS

| 7,070,295 | B1* | 7/2006 | Lee | ............................ | B62J 6/03 |
| | | | | | 362/474 |
| 9,290,223 | B2* | 3/2016 | Lee | ............................ | B62J 6/03 |
| 2009/0135619 | A1* | 5/2009 | Hung | .......................... | B62J 6/03 |
| | | | | | 362/474 |
| 2012/0218771 | A1* | 8/2012 | Yen | ............................ | B62J 6/03 |
| | | | | | 362/473 |

* cited by examiner

*Primary Examiner* — Thomas M Sember
(74) *Attorney, Agent, or Firm* — Prakash Nama; Global IP Services, PLLC

(57) ABSTRACT

A quick disassembly structure and a bicycle light; by arranging a lower assembly and a upper assembly, and then fixing an axial component on the lower assembly, when pressing the upper assembly, the positioning device can enter the limit area to fix the upper assembly and the lower assembly; when pulling up the upper assembly, the positioning device can be disengaged from the limit area to unfix the upper assembly and the lower assembly, so that the upper assembly can be quickly mounted on the lower assembly or the upper assembly can be quickly dismounted from the lower assembly, in order to achieve a quick mount or disassembly of a bicycle light, while the bicycle light can be prevented from being interfered and corroded by external factors when not being used, and the light body can also be prevented from being stolen, thereby achieving protection of the bicycle light.

10 Claims, 8 Drawing Sheets

QUICK DISASSEMBLY STRUCTURE AND BICYCLE LIGHT

BACKGROUND OF THE INVENTION

The present invention relates to the technical field of bicycle light device and more particularly a quick disassembly structure and bicycle light.

Nowadays, while the number of vehicles is growing rapidly along with the global popularization of low-carbon concepts and people's increasing concern for health, green traveling has become a new trend, and bicycles thus gradually become an indispensable means of transportation in people's daily life, work, leisure, and sports. A lack of lighting system of the existing bicycles has causes inconvenience and safety hazards to people when using at night. Based on that, bicycle lights for night lighting and warning have come into being.

There are some shortcomings of the existing bicycle lights in the market. Most traditional bicycle lights have fixed assembling structures, resulting in lower detachability with inconvenience, and are extremely easy to be corroded due to the interference of sunlight, rain and other external factors, causing spontaneous combustion and a short service life of bicycle lights.

BRIEF SUMMARY OF THE INVENTION

In view of the shortcomings of the existing technology, it is an object of the present invention to provide a quick disassembly structure and bicycle light to achieve the quick disassembly of lights for bicycles.

To attain this, the present invention adopts the following technical solutions:

A quick disassembly structure, comprising:

a lower assembly, comprising: a first connecting base and a fixing component; the fixing component is movably mounted on the first connecting base through a first elastic component, and is vertically movable with respect to the first connecting base;

an upper assembly, detachably mounted on the lower assembly; the upper assembly comprises: a second connecting base and at least one positioning device; the second connecting base is further provided inside with a guiding groove in an axial direction thereof, and the second connecting base is further provided inside with at least one mounting groove in a radial direction thereof; the at least one positioning device is arranged within the at least one mounting groove, and the at least one positioning device is capable to be transversely biased into the guiding groove or retracted from the guiding groove;

an axial assembly, fixed to the lower assembly; the axial assembly comprises: an axial component; a first end portion of the axial component passes through the fixing component, and is fixed to the first connecting base; a second end portion of the axial component is arranged within the guiding groove, a side wall of the axial component is provided with a limit area, and the first end portion and the second end portion of the axial component are opposite to each other;

wherein, when pressing the upper assembly, the positioning device is capable to be engaged into the limit area, so as to fix the upper assembly and the lower assembly; when pulling up the upper assembly, the positioning device is capable to be disengaged from the limit area, so as to unfix the upper assembly and the lower assembly.

Further, the axial assembly further comprises: a guiding component, which movably sleeves the axial component, and the guiding component is arranged within the limit area.

Further, the positioning device comprises: a positioning component, which is arranged within the mounting groove through a second elastic component; when the second elastic component is not compressed, a part of the positioning component is arranged within the guiding groove.

Further, the positioning component is provided with a first inclined portion at an end proximal to the guiding groove, and the second end portion of the axial component is further provided with a second inclined portion; when pressing down the upper assembly, the second inclined portion abuts against the first inclined portion, so that the positioning component is capable to be completely retracted into the mounting groove.

Further, a width of the first inclined portion gradually increases from a part thereof proximal to the lower assembly to a part thereof away from the lower assembly; correspondingly, a width of the second inclined portion gradually decreases from a part thereof proximal to the lower assembly to a part thereof away from the lower assembly.

Further, a third inclined portion is provided on the guiding component; a width of the third inclined part gradually increases from a part thereof proximal to the lower assembly to a part thereof away from the lower assembly.

Further, a first transition portion is provided on a part of an inclined surface of the second inclined portion proximal to the third inclined portion; a second transition portion is provided on a part of an inclined surface of the third inclined portion proximal to the second inclined portion; a width of the second transition portion is not less than a width of the first transition portion.

Further, the upper assembly is provided with a first serrated portion on an end surface thereof proximal to the lower assembly; correspondingly, an end surface of the lower assembly thereof proximal to the upper assembly is provided with a second serrated portion; when the upper assembly and the lower assembly are fixed, the first serrated portion is capable be engaged with the second serrated portion to restrict the relative rotation of the upper assembly and the lower assembly.

Further, the quick disassembly structure further comprises: a clamping device; the clamping device is fixed to an end of the first connecting base away from the upper assembly.

The present invention further provides a bicycle light comprising the aforementioned quick disassembly structure, and further comprises: a light body; the light body is mounted to the upper assembly.

The beneficial effects of the present invention include:

(1) By arranging a lower assembly and an upper assembly, and then fixing an axial component on the lower assembly; when pressing the upper assembly, the positioning device can enter the limit area to fix the upper assembly and the lower assembly; when pulling up the upper assembly, the positioning device can be disengaged from the limit area to unfix the upper assembly and the lower assembly, so that the upper assembly can be quickly mounted onto the lower assembly or the upper assembly be quickly dismounted from the lower assembly, thereby achieving a quick mount or dismount of a bicycle light. Accordingly, the bicycle light can be prevented from being interfered and corroded by external factors when not being used, and the light body can also be prevented from being stolen, thereby achieving the protection of the bicycle light.

(2) A first serrated portion and a second serrated portion are provided on one hand to achieve better positional fixation of the bicycle light when the bicycle light is mounted on the upper assembly so as to prevent the bicycle light from rotating when the bicycle is used on a bumpy surface; and on the other hand to adjust the direction of the bicycle light during use so as to enhance users' experience when using the bicycle light.

Figure 1:
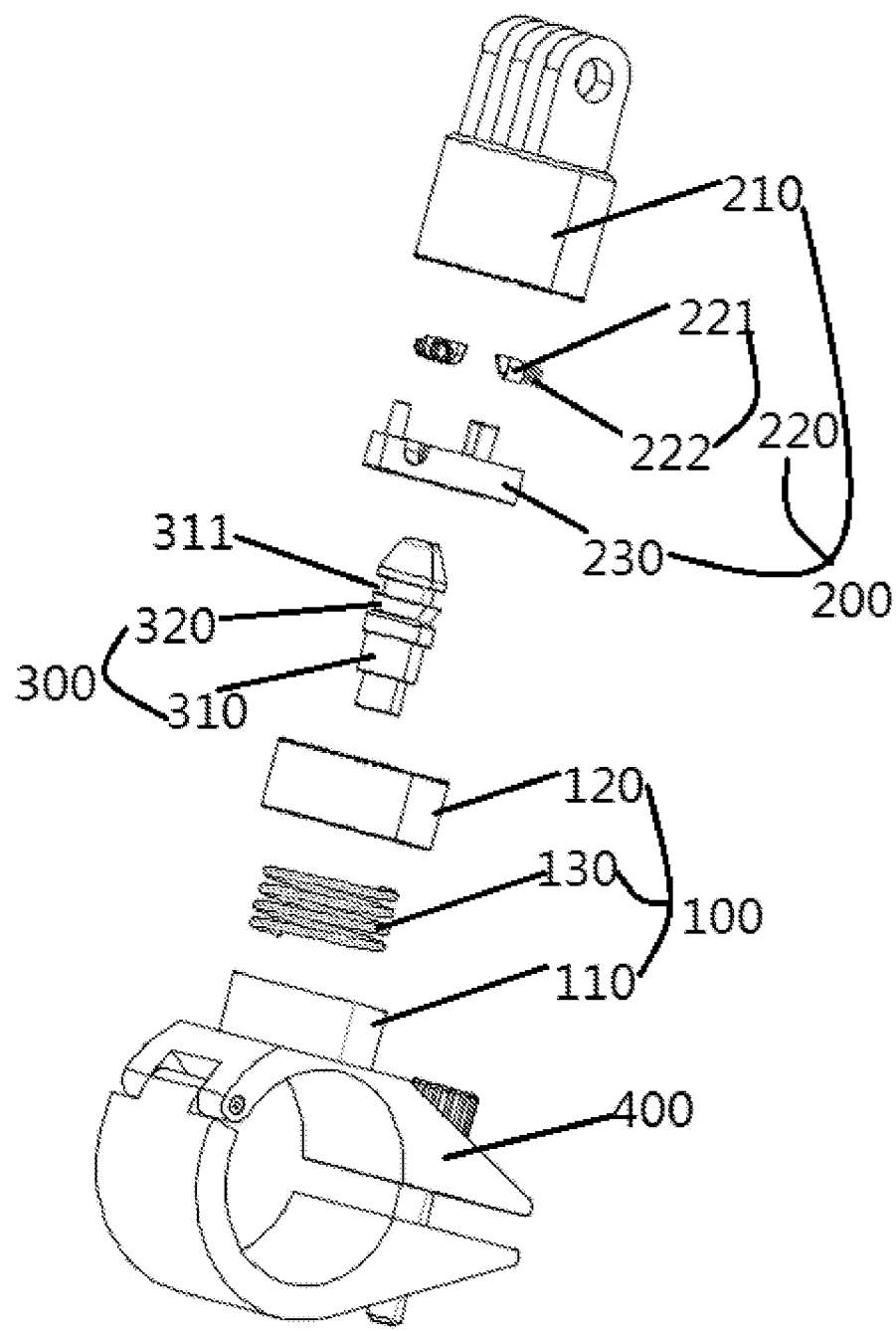
FIG. 1 shows a schematic diagram of the explosive structure of the present invention.

As illustrated in the figures, 100 denotes the lower assembly, 110 denotes the first connecting base, 120 denotes the fixing component, 121 denotes the second serrated portion, 130 denotes the first elastic component; 200 denotes the upper assembly, 210 denotes the second connecting base, 211 denotes the guiding groove, 212 denotes the first serrated portion, 220 denotes the positioning device, 221 denotes the positioning component, 2211 denotes the first inclined portion, 222 denotes the second elastic portion, 230 denotes the mounting base, 231 denotes the mounting groove, 232 denote the through hole, 300 denotes the axial assembly, 310 denotes the axial component, 311 denotes the limiting area, 312 denotes the second inclined portion, 313 denotes the first transition portion, 320 denotes the guiding component, 321 denotes the third inclined portion, 322 denotes the second transition portion; 400 denotes the clamping device; 500 denotes the light body.

DETAILED DESCRIPTION OF THE INVENTION

The following describes in detail the embodiments of the present invention; examples of the embodiments are shown in the accompanying drawings, in which the same or similar reference numerals always indicate the same or similar elements or elements with the same or similar functions. The embodiments described below with reference to the drawings are exemplary, which are only adopted to explain the present invention, but not to set a limit to the present invention.

In the description of the present invention, it should be understood that the terms "length", "width", "upper", "lower", "front", "rear", "left", "right", "vertical", "horizontal", "top", "bottom", "inner" and "outer" indicate the orientation or positional relationship based on the orientation or positional relationship shown in the drawings, which are only for the convenience of describing the present invention and simplifying the description, instead of indicating or implying that the device or element referred to must have a specific orientation, be constructed and operated in a specific orientation, and thus should not be understood as a limit to the present invention.

Besides, the terms "first" and "second" are only adopted for descriptive purposes, and cannot be understood as indicating or implying relative importance or implicitly indicating the number of technical features indicated. Therefore, the features defined with "first" and "second" may explicitly or implicitly include one or more of these features. In the description of the present invention, the meaning of "multiple" refers to two or more than two, unless otherwise specifically defined.

In the description of the present invention, unless otherwise specified and restricted, the terms such as "mounted", "connected", "attached", "fixed" should be understood in a broad sense; for examples, the terms can refer to a fixed connection, a detachable connection, or connection as an integral component; they can refer to a mechanical connection or an electrical connection; they can refer to being directly connected, being indirectly connected through an intermediate medium, the internal communication between two components, or the interaction between two elements. For those of ordinary skill in the art, the specific meanings of the aforementioned terms in the present invention can be understood according to specific circumstances.

Figure 2:
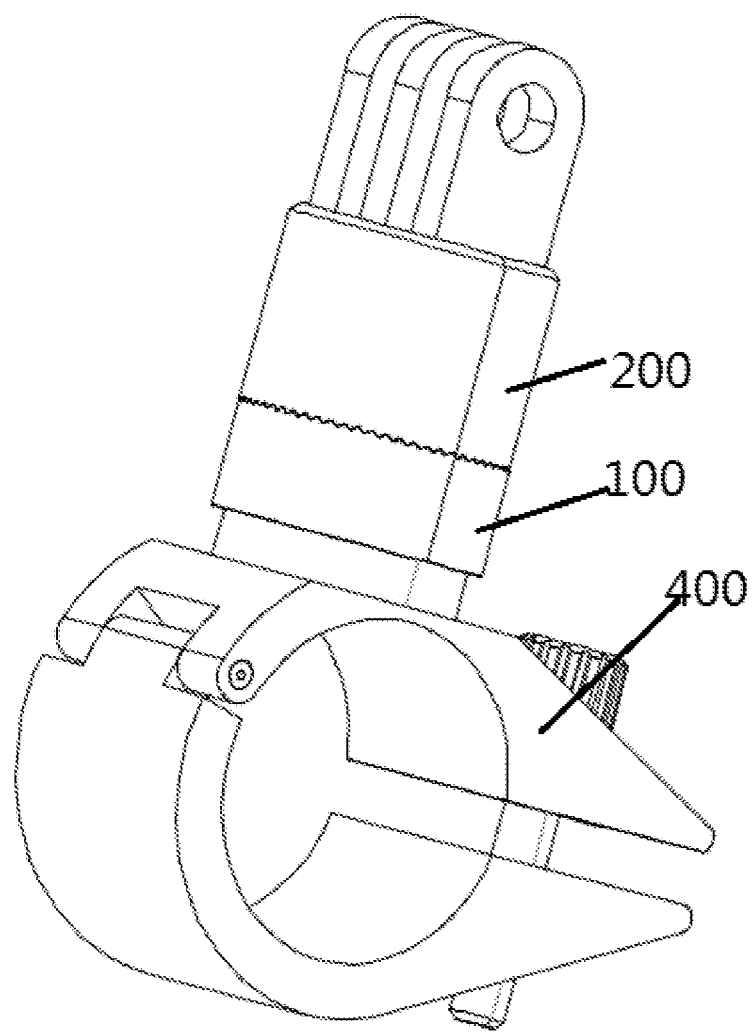
FIG. 2 shows a schematic diagram of the present invention.
Figure 3:
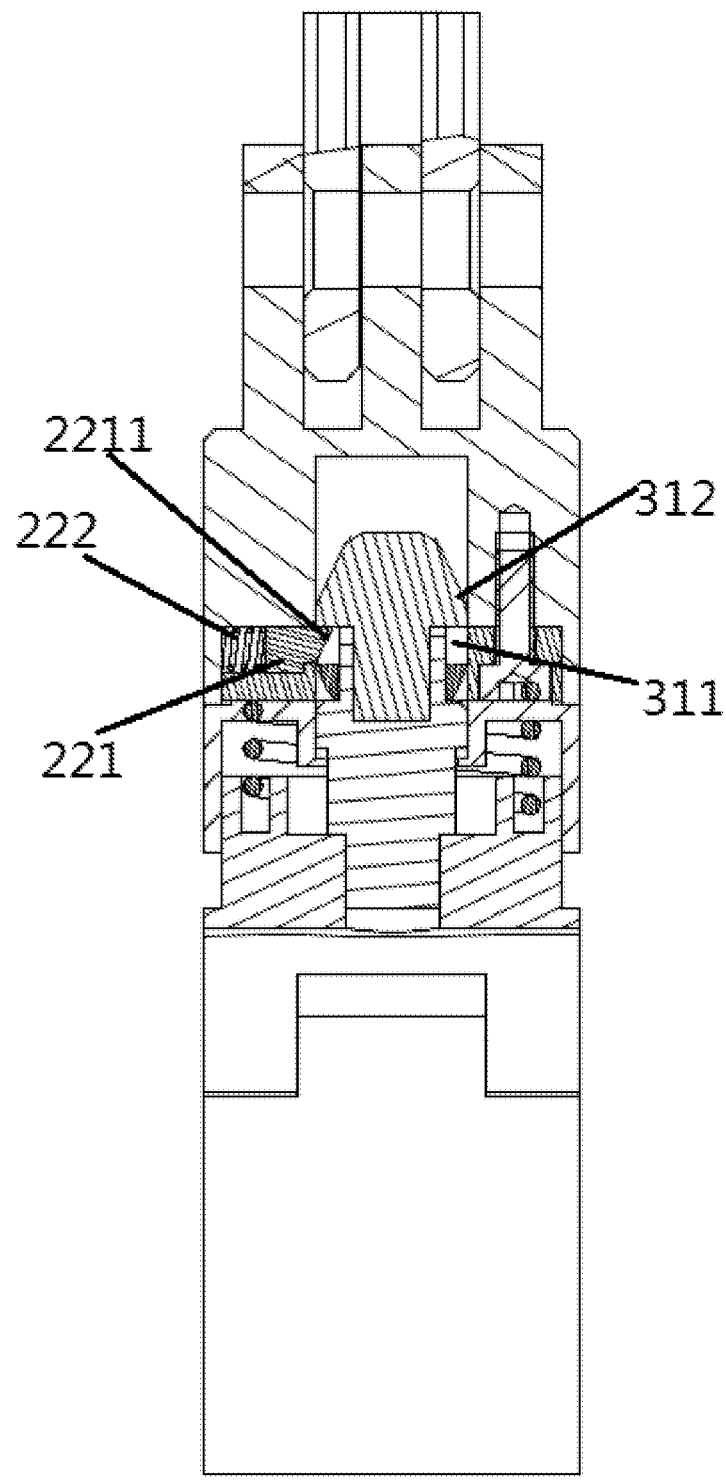
FIG. 3 shows a schematic diagram of the present invention when an upper assembly and a lower assembly are fixed.
Figure 4:
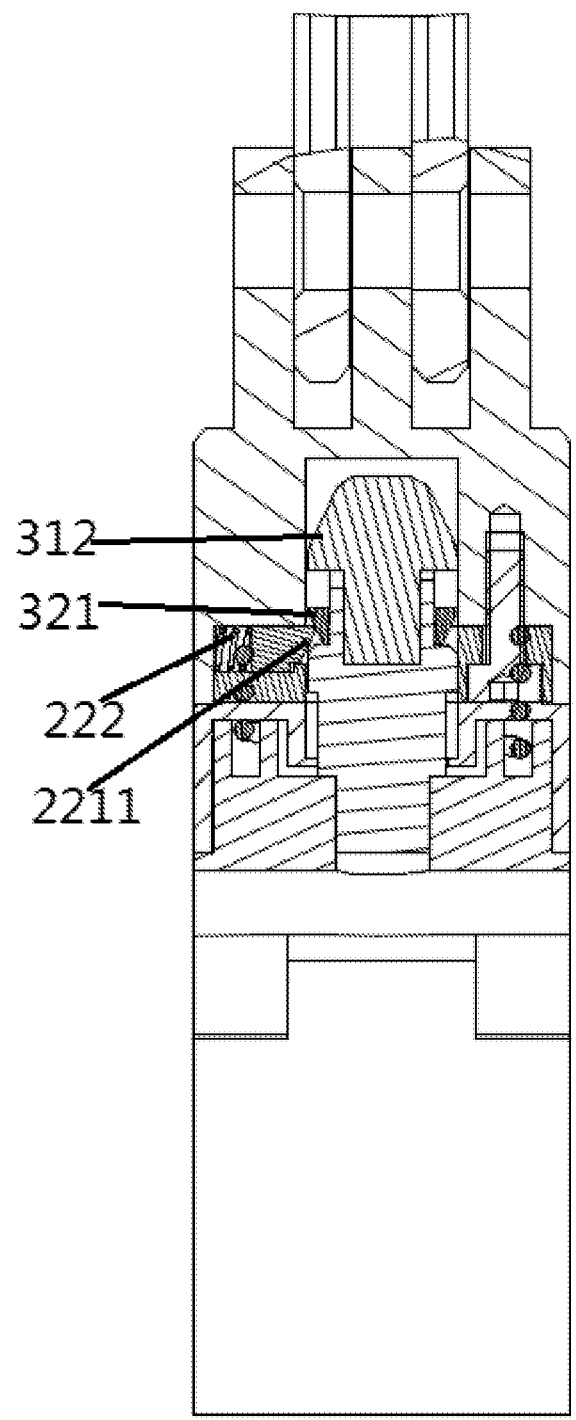
FIG. 4 is a schematic diagram of the present invention when a positioning component abuts against a guiding component.
Figure 5:
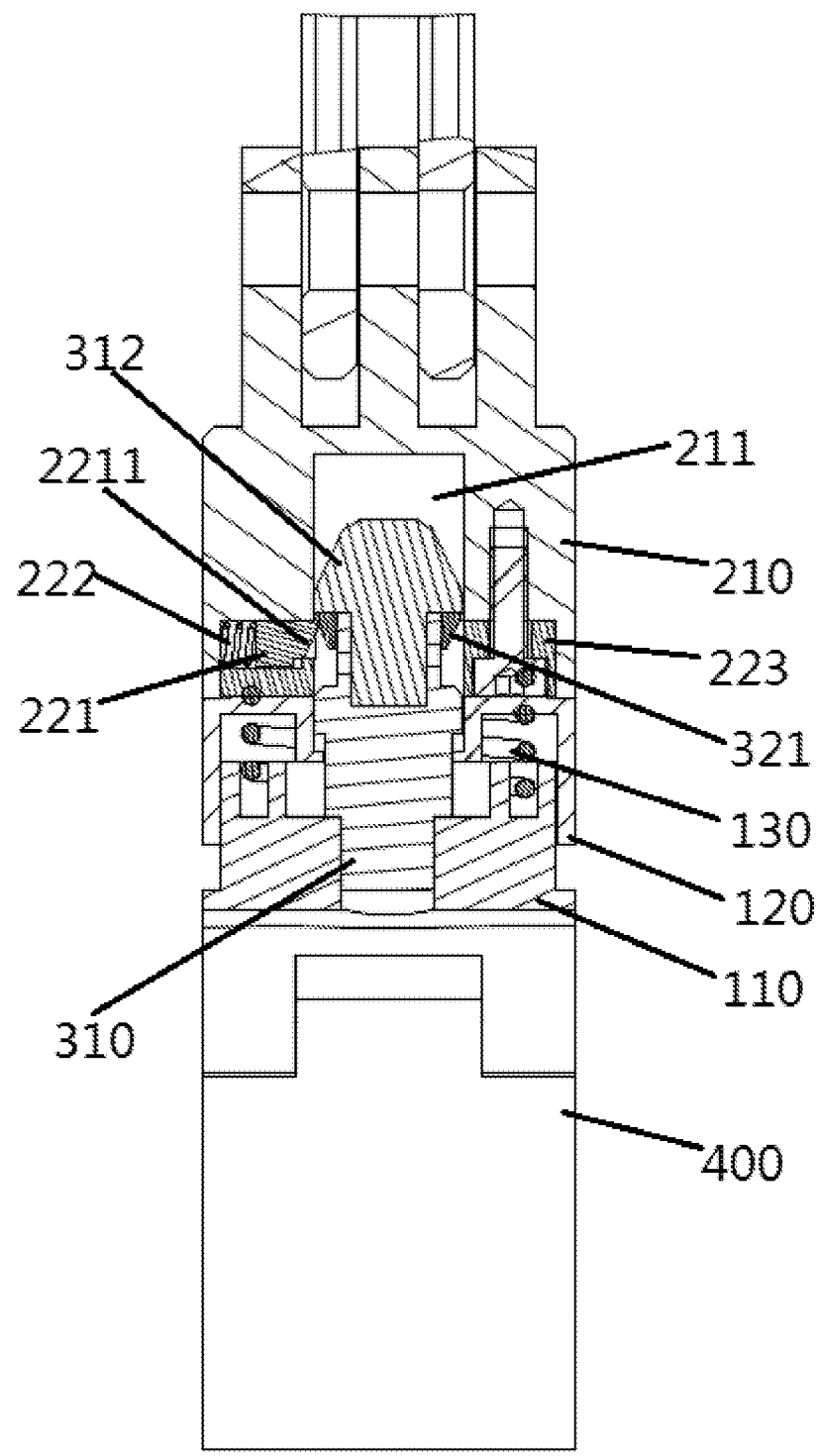
FIG. 5 is a schematic diagram of the present invention when the guiding component is driven to the top of the limit area.
Figure 6:
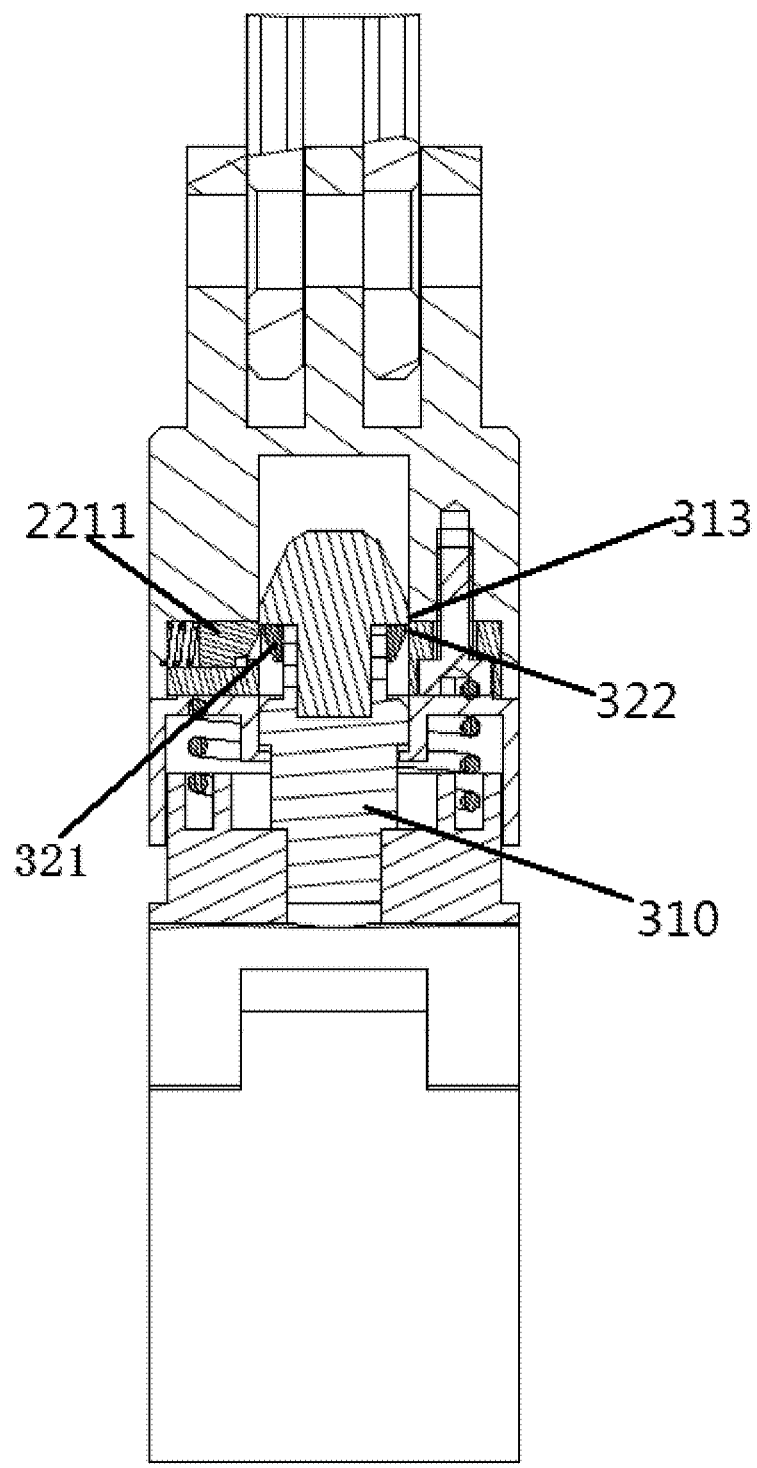
FIG. 6 is a schematic diagram of the present invention when a positioning component is just separated from a guiding component.
Figure 7:
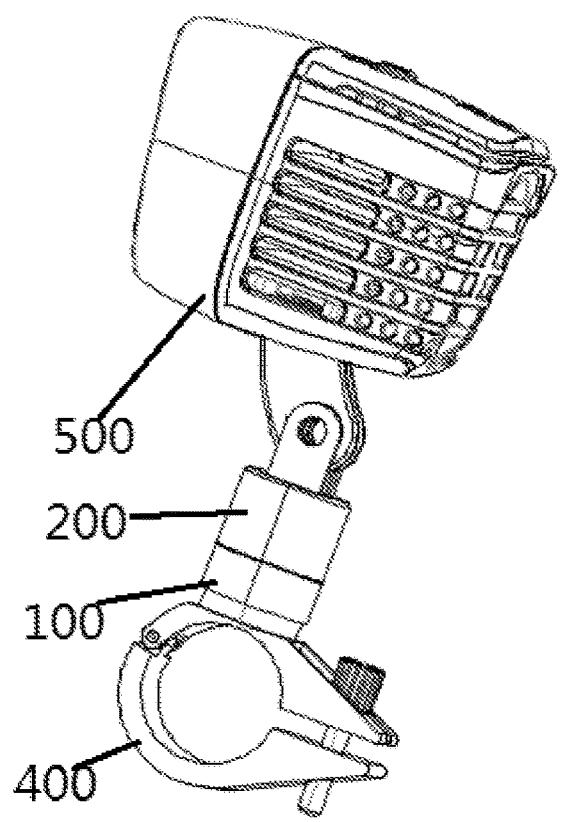
FIG. 7 is a schematic diagram of the present invention when connecting to a light body.
Figure 8:
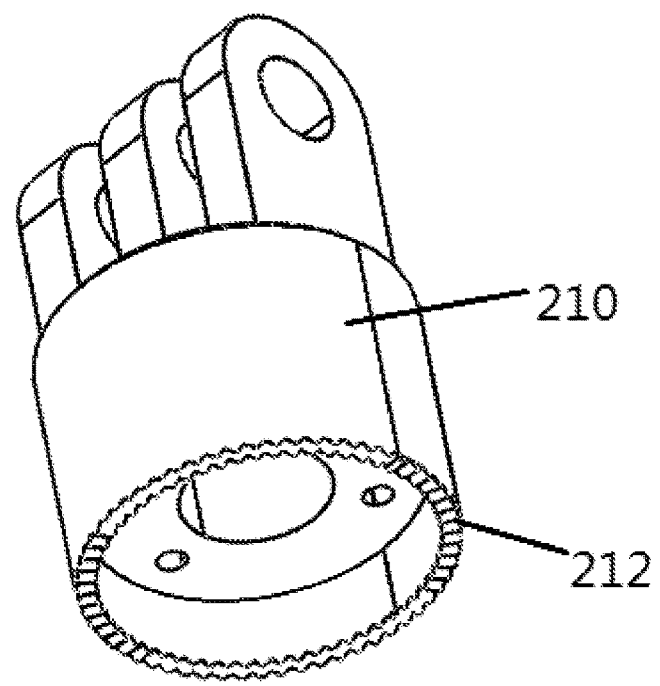
FIG. 8 is a schematic diagram of a second connecting base in the present invention.
Figure 9:
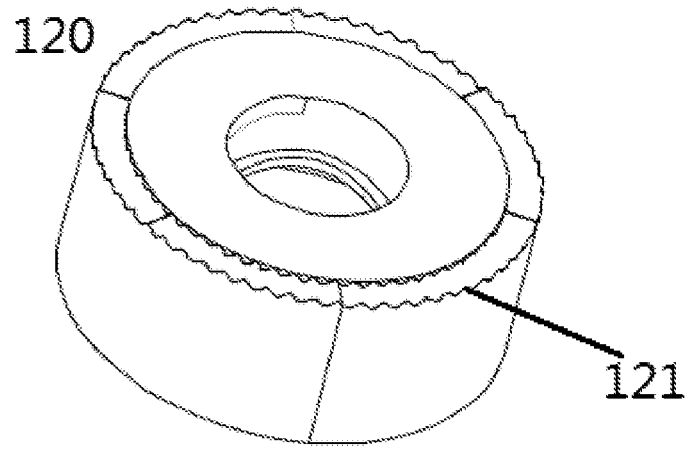
FIG. 9 is a schematic diagram of a first connecting base in the present invention.
Figure 10:
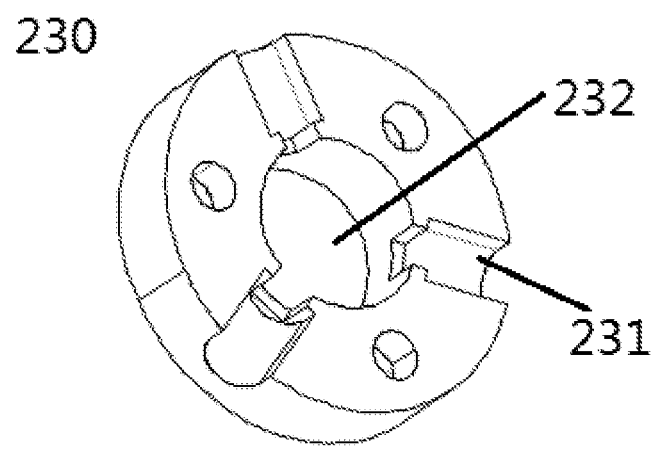
FIG. 10 is a schematic diagram of a mounting base in the present invention.

As illustrated in FIGS. 1-10, a quick disassembly structure comprises: a lower assembly 100, an upper assembly 200 and an axial assembly 300; the lower assembly further comprises: a first connecting base 110 and a fixing component 120; the fixing component 120 is movably mounted on the first connecting base 110 through a first elastic component 130, and is vertically movable with respect to the first connecting base 110; the upper assembly 200 is detachably mounted on the lower assembly 100, and the upper assembly 200 further comprises: a second connecting base 210 and at least one positioning device 220; the second connecting base 210 is further provided inside with a guiding groove 211 in an axial direction thereof, and the second connecting base 210 is further provided inside with at least one mounting groove 231 in a radial direction thereof; the at least one positioning device 220 is arranged within the at least one mounting groove 231, and the at least one positioning device 220 can be transversely biased into the guiding groove 211 or retracted from the guiding groove 211; the axial assembly 300 is fixed to the lower assembly 100, and the axial assembly 300 further comprises: an axial component 310; a first end portion of the axial component 310 passes through the fixing component 120, and is fixed to the first connecting base 110; a second end portion of the axial component 310 is arranged within the guiding groove 211, a side wall of the axial component 310 is provided with a limit area 311, and the first end portion and the second end portion of the axial component 310 are opposite to each other; wherein, when pressing the upper assembly 200, the positioning device 220 can engage into the limit area 311, so as to fix the upper assembly 200 and the lower assembly 100; when pulling up the upper assembly 200, the positioning device 220 can be disengaged from the limit area 311, so as to unfix the upper assembly 200 and the lower assembly 100. In this embodiment, the limit area 311 is an annular groove.

In the above embodiments, the axial assembly 300 further comprises: a guiding component 320, which movably sleeves the axial component 310, and the guiding component 320 is arranged within the limit area 311; by arranging the position of the guiding component 320, the range of movement of the guiding component 320 is restricted, and the guiding component 320 can therefore be prevented from disengaging from the limit area 311.

In the above embodiments, the positioning device 220 further comprises: a positioning component 221, which is arranged within the mounting groove 231 through a second elastic component 222; when the second elastic component 222 is not compressed, a part of the positioning component 221 is arranged within the guiding groove 211, so that the positioning device 220 can enter the limit area 311 or retract from the limit area 311, so that the upper assembly 200 can be fixed to the lower assembly 100 when the bicycle light is mounted, and the upper assembly 200 can be disengaged from the lower assembly 100 when the bicycle light is dismounted; a length of the limiting area 311 is larger than or equal to a sum of widths of the guiding component 320 and the positioning component 221; in this embodiment, the number of the mounting grooves 231 is three, and correspondingly, the number of the positioning device 220 is also three; furthermore, the positioning component 221 is provided with a first inclined portion 2211 at an end proximal to the guiding groove 211, and the second end portion of the axial component 310 is further provided with a second inclined portion 312; when pressing down the upper assembly 200, the second inclined portion 312 abuts against the first inclined portion 2211, so that the positioning component 221 can be completely retracted into the mounting groove 231; specifically, a width of the first inclined portion 2211 gradually increases from a part thereof proximal to the lower assembly 100 to a part thereof away from the lower assembly 100; correspondingly, a width of the second inclined portion 312 gradually decreases from a part thereof proximal to the lower assembly 100 to a part thereof away from the lower assembly 100.

In the above embodiment, the second connecting base 210 is further provided inside with a mounting base 230, the mounting base 230 is fixed by screws to an end of the second connecting base 210 proximal to the lower assembly 100; the mounting groove 231 is arranged on the mounting base 230, and a through hole 232 is also provided in a middle part of the mounting base 230; the through hole 232 is in communication with the guiding groove 211, and a size and a position of the through hole 232 correspond to a size and a position of the guiding groove 211.

In the above embodiment, in order to increase the difficulty of disassembling the upper assembly 200 from the lower assembly 100, and thereby preventing the bicycle light from being easily disassembled and reducing the possibility of the bicycle light being stolen, a third inclined portion 321 is provided on the guiding component 320; a width of the third inclined part 321 gradually increases from a part thereof proximal to the lower assembly 100 to a part thereof away from the lower assembly 100; so that when disassembling the bicycle light, the user must first press the upper assembly 200 downwards until the positioning component 221 contacts the guiding component 320, and then pull the upper assembly 200 upwards, so that the positioning component 221 is disengaged from the limit area 311.

In the above embodiment, a bottom surface of the second inclined portion 312 and a corresponding opposite facing top surface of the third inclined portion 321 are both flat.

In the above embodiment, a first transition portion 313 is provided on a part of an inclined surface of the second inclined portion 312 proximal to the third inclined portion 321; a second transition portion 322 is provided on a part of an inclined surface of the third inclined portion 321 proximal to the second inclined portion 312; a width of the second transition portion 322 is not less than a width of the first transition portion 313; specifically, an outer side wall of the first transition portion 313 and an outer side wall of the second transition portion 322 are both perpendicular to the bottom surface of the second inclined portion 312; the arrangement of the first transition portion 313 and the second transition portion 322 makes the positioning component 221 easier to slide from the guiding component 320 into the mounting groove 231 of the second connecting base 210.

In the above embodiment, the upper assembly 200 is provided with a first serrated portion 212 on an end surface thereof proximal to the lower assembly 100; correspondingly, an end surface of the lower assembly 100 thereof proximal to the upper assembly 200 is provided with a second serrated portion 121; when the upper assembly 200 and the lower assembly 100 are fixed, the first serrated portion 212 can be engaged with the second serrated portion 121 to restrict the relative rotation of the upper assembly 200 and the lower assembly 100; specifically, the first serrated portion 212 is arranged on an end of the second connecting base 210 proximal to the lower assembly 100; the second serrated portion 121 is arranged on an end of the fixing component 120 proximal to the lower assembly 100; each of the first serrated portion 212 and the second serrated portion 121 comprises a plurality of serrations; the serrations on the second connecting base 210 are evenly arranged on a peripheral area of the second connecting base 210; correspondingly, the serrations on the fixing component 120 are also evenly arranged on a peripheral area of the fixing component 120.

In the above embodiment, the quick disassembly structure further comprises: a clamping device 400; the clamping device 400 is adopted to fix to a bicycle crossbar; the clamping device 400 is fixed to an end of the first connecting base 110 away from the upper assembly 200.

The present invention further provides a bicycle light comprising the aforementioned quick disassembly structure, and further comprises: a light body 500; the light body 500 is mounted to the upper assembly 200; specifically, the second connecting base 210 is provided with a connecting portion at an end away from the lower assembly 100, and the connecting portion is connected to the light body 500; in this embodiment, the connecting portion and the light body 500 are fixed by screw connection.

Working principle: when mounting the bicycle light, place the upper assembly 200 mounted with the lamp body 500 on the fixing component 120; press down the upper assembly 200; since the fixing component 120 is connected to the first connecting base 110 through the first elastic component 130, the upper assembly 200 can move towards the lower assembly 100; at this time, the first inclined portion 2211 on the positioning component 221 is in contact with the second inclined portion 312 on the axial component 310, so that the positioning component 221 can compress the second elastic component 222, and move into the mounting groove 231 until the first inclined portion 2211 and the second inclined portion 312 are out of contact, and the positioning device 220 moves to a position corresponding to the limit area 311; at this time, the second elastic component 222 is decompressed and resets, and the upper assembly 200 and the lower assembly 100 are fixed to achieve the mounting of the light body 500;

when disassembling the bicycle light, the guiding component 320 is positioned on a lower part of the limit area 311; on the basis of the above, continue to press the upper assembly 200, and in the process of pressing down the upper assembly 200, the third inclined portion 321 abuts against the first inclined portion 2211, so that the first inclined portion 2211 retracts into the mounting groove 231; when the upper assembly 200 is continued to be pressed down, the positioning device 220 is driven to a position below the top surface of the third inclined portion 321 down to the inclined surface of the third inclined portion 321; at this time, the first inclined portion 2211 abuts against the third inclined portion 321 due to the biasing force of the second elastic component 222; pull the upper assembly 200 upwards; at this time, the guiding component 320 is driven up towards the upper assembly 200 by the first inclined portion 2211, until the top surface of the third inclined portion 321 is in contact with the bottom surface of the second inclined portion 312; continue to pull the upper assembly 200, and the positioning component 221 is driven passed the third inclined portion 321 and now in contact with the second inclined portion 312, so as to unfix the upper assembly 200 and the lower assembly 100, and thereby achieving the disassembly of the light body 500.

The above embodiments are only one of the more preferred specific example of the present invention, and all modifications and substitutions made in accordance with the essence of the main technical solution of the present invention shall fall within the protection scope of the present invention.

What is claimed is:

1. A quick disassembly structure, comprising:
a lower assembly, comprising: a first connecting base and a fixing component; the fixing component is movably mounted on the first connecting base through a first elastic component, and is vertically movable with respect to the first connecting base;
an upper assembly, detachably mounted on the lower assembly; the upper assembly comprises: a second connecting base and at least one positioning device; the second connecting base is further provided inside with a guiding groove in an axial direction thereof, and the second connecting base is further provided inside with at least one mounting groove in a radial direction thereof; the at least one positioning device is arranged within the at least one mounting groove, and the at least one positioning device is capable to be transversely biased into the guiding groove or retracted from the guiding groove;
an axial assembly, fixed to the lower assembly; the axial assembly comprises: an axial component; a first end portion of the axial component passes through the fixing component, and is fixed to the first connecting base; a second end portion of the axial component is arranged within the guiding groove, a side wall of the axial component is provided with a limit area, and the first end portion and the second end portion of the axial component are opposite to each other;
wherein, when pressing the upper assembly, the positioning device is capable to be engaged into the limit area, so as to fix the upper assembly and the lower assembly; when pulling up the upper assembly, the positioning device is capable to be disengaged from the limit area, so as to unfix the upper assembly and the lower assembly.

2. The quick disassembly structure of claim 1, wherein the axial assembly further comprises: a guiding component, which movably sleeves the axial component, and the guiding component is arranged within the limit area.

3. The quick disassembly structure of claim 2, wherein the positioning device comprises: a positioning component, which is arranged within the mounting groove through a second elastic component; when the second elastic component is not compressed, a part of the positioning component is arranged within the guiding groove.

4. The quick disassembly structure of claim 3, wherein the positioning component is provided with a first inclined portion at an end proximal to the guiding groove, and the second end portion of the axial component is further provided with a second inclined portion; when pressing down the upper assembly, the second inclined portion abuts against the first inclined portion, so that the positioning component is capable to be completely retracted into the mounting groove.

5. The quick disassembly structure of claim 4, wherein a width of the first inclined portion gradually increases from a part thereof proximal to the lower assembly to a part thereof away from the lower assembly; correspondingly, a width of the second inclined portion gradually decreases from a part thereof proximal to the lower assembly to a part thereof away from the lower assembly.

6. The quick disassembly structure of claim 5, wherein a third inclined portion is provided on the guiding component; a width of the third inclined part gradually increases from a part thereof proximal to the lower assembly to a part thereof away from the lower assembly.

7. The quick disassembly structure of claim 6, wherein a first transition portion is provided on a part of an inclined surface of the second inclined portion proximal to the third inclined portion; a second transition portion is provided on a part of an inclined surface of the third inclined portion proximal to the second inclined portion; a width of the second transition portion is not less than a width of the first transition portion.

8. The quick disassembly structure of claim 1, wherein the upper assembly is provided with a first serrated portion on an end surface thereof proximal to the lower assembly; correspondingly, an end surface of the lower assembly thereof proximal to the upper assembly is provided with a second serrated portion; when the upper assembly and the lower assembly are fixed, the first serrated portion is capable be engaged with the second serrated portion to restrict relative rotation between the upper assembly and the lower assembly.

9. The quick disassembly structure of claim 8, wherein the quick disassembly structure further comprises: a clamping device; the clamping device is fixed to an end of the first connecting base away from the upper assembly.

10. A bicycle light, comprising the quick disassembly structure of claim 1, and further comprises: a light body; the light body is mounted to the upper assembly.

* * * * *